March 3, 1959  L. J. KMIECIK  2,875,978
VALVE CONSTRUCTION
Filed April 25, 1956

INVENTOR.
Leopold J. Kmiecik,
BY
Attys.

United States Patent Office 2,875,978
Patented Mar. 3, 1959

2,875,978
VALVE CONSTRUCTION
Leopold J. Kmiecik, Chicago, Ill., assignor to McDonnell & Miller, Inc., Chicago, Ill., a corporation of Delaware Application April 25, 1956, Serial No. 580,493
5 Claims. (Cl. 251—333)

This invention relates to valves and more particularly to a new and improved construction in valve seats for pressure-relief and other type valves.

In the usual valve construction, the valve seat member and the valve member cooperable therewith are normally formed of metal. The effectiveness of a valve in controlling flow of fluid is, of course, dependent on maintaining good seating relationship between the valve seat and valve member. A short-coming of the use of metals for this purpose lies in the fact that they are subject to corrosion, and the valve may, due to wear or scuffing of the seating surfaces by hard particles in the fluid being controlled or otherwise, become ineffective.

It is therefore the principal object of the present invention to provide a novel construction of valve member and seat which overcomes the aforementioned problems and disadvantages.

With this in mind it is a further object of the present invention to provide a valve seat of material that will be resistant to elevated temperatures, which will be inert and otherwise substantially unaffected by impurities, etc., which may be present in fluid controlled by the valve such, for example, as may be found in ordinary hot water pressure systems.

It is also a further object of the invention to provide a valve and seat construction which will be substantially non-clogging and in which the valve seat will adapt itself to intimately fit with the valve member to provide an effective seal therebetween without requiring expensive surface operations to obtain and maintain a proper fit.

With these and other objects of the invention in mind, I preferably form my valve seat out of polymerized tetrafluorethylene synthetic resin such as is commonly sold under the trade name "Teflon." This material I have found is excellent for the purpose since it will resist temperatures up to 700° F. or better and may be readily and conveniently fabricated to required shape by any one of several methods such as molding, casting, machining, die-cutting, etc. Furthermore, the material is remarkably resistant to acids and other impurities that may be present in the system and by reason of its thermosetting character will retain its shape even at the aforementioned elevated temperatures.

Furthermore, I have found that, due to the self-lubricating property and low coefficient of friction of such resin, particles and other materials or impurities ordinarily present in a hot water system do not adhere to the surface of the valve seat but tend to slide thereover so that accumulation or deposits of material are not built up over a period of usage to clog or score the seating surfaces preventing effective sealing of the valve member with its seat as often happens when valve seats of metal are utilized.

However, I have also found that other thermosetting plastics such as the silicone resins possess similar properties of low chemical activity, low adhesion and resistance to heat, although to a lesser extent, and may also be used as a material from which my valve seats may be formed. However, in valve devices which are to be used in hot water systems where the temperatures are likely to exceed temperatures of 400° F. or thereabouts, I prefer to form the seats of the first mentioned fluorinated polymers, such as "Teflon," because of the greater resistance to these higher temperatures that it possesses. Thus, I have found that the steam existing at these higher temperatures tends to dissolve the binder in the silicone resin and so destroy its further usefulness as a valve seat. Nevertheless, in low pressure systems where the temperatures are kept well below 400°, seats formed of silicone resin prove very satisfactory and in some respects are to be preferred because of the fact that the silicone resins have a greater amount of inherent resiliency than the mentioned fluorinated polymer, "Teflon," and which characteristic may be used to advantage in promoting a tight seal between the valve member and its seat. Other thermosetting materials such as Neoprene and the synthetic rubbers which will vulcanize and stick to the metal valve member when subjected to these aforementioned temperatures and pressure over a period of time are, of course, to be avoided. Neither the "Teflon" nor the mentioned silicone resins possess this undesired low temperature vulcanizing property.

It is thus a further important object of the invention to provide a valve seat formed of a heat-resistant inert thermosetting resin which will not vulcanize or stick to the valve member when subjected to the normal temperatures and pressures of the system in which the valve operates and which is further characterized by a sufficiently low adhesion or coefficient of friction factor that particles and the like present in the system will not adhere or build up on the surface of the valve seat to clog or otherwise hamper the efficient operation of the valve.

A still further object of the invention is to form a valve seat of a resin such as polymerized tetrafluorethylene which is further characterized by having resistance to heat of temperatures up to 700° F. in addition to possessing relatively low coefficient of friction and self-lubricating properties.

Another object of the invention is to provide a valve seat of a material such as a silicone resin which, although possessing less resistance to heat than the aforementioned polymerized tetrafluoroethylene resin, is further characterized by possessing a high degree of inherent resiliency, which may be utilized in tightly sealing the valve member thereagainst.

Although the aforementioned properties of these and other thermosetting synthetic resins are advantageously utilized in the present invention to provide a self-cleaning, non-clogging valve seat construction, these properties do introduce certain problems of construction, foremost of which is the tendency of the seat, by reason of its inherent resilient, low adhesion factor or slippery character, to creep or slide on a supporting surface and which obviously, if not restricted, will interfere with the proper seating of the valve member thereon. Thus it is a further and important object of the invention to devise means of positively anchoring and securing such a valve seat in an aligned and fixed relation with the valve member.

Preferably a valve seat member according to the present invention will be of generally annular shape with a central circular opening and the valve member will be adapted to extend within said opening and have a surface of general frustoconical shape to engage on the peripheral edge of the valve seat about said opening to establish line contact therewith.

One effective way for anchoring such a valve seat and securing it against creep involves forming it with an offset shoulder which I preferably obtain by spacing the outer peripheral portion of said ring member in a plane below the plane of its inner peripheral portion so as to provide an intermediate connecting portion at right angles to said two planes and confining the valve seat between a pair of clamps having similarly shaped surfaces so that all but a small margin of its top surface adjacent its inner peripheral edge on which the valve member seat is covered. In this manner, axial movement of the ring member will be prevented by the confinement of its outer peripheral portion between the clamps while its movement in a direction transversely of the valve member will be restricted by the confinement of its intermediate connecting portion between the normally disposed surface portions of the clamps. Preferably the inner peripheral portion of the ring is less tightly compressed between the clamps whereby it will be capable of yielding sufficiently to conform to the shape of the contacting part of the valve member and so obtain the best possible seal therewith. The aforementioned stepped construction of the ring members and engaging surfaces of the two clamps has the further advantage of providing an effective seal to prevent leakage between the valve seat ring and its supporting surface.

Although the peripheral edge of said annular member on which the valve member normally rests may in its initial fabrication be provided with a sharply defined right angled corner-like shape, no problem presents itself, if through use, said edge becomes somewhat rounded. This is achieved not only because the contacting surface of the valve member rests at an angle on said edge but also because the inherent flexibility or resiliency of the material of the valve seat in addition to its other properties, permits it to accommodate to the shape of the valve member, whereby the desired intimate line contact therebetween will not be destroyed. This is a further important feature of the invention.

Many other objects as well as advantages of the invention will be or will become apparent to those skilled in the art from the more detailed description of a specific embodiment thereof which follows, and it is further to be understood that said description which follows is not to be taken in a limiting sense but that many changes and/or modifications may be made therein in accordance with the spirit of the invention as defined in the appended claims.

Figure 1:
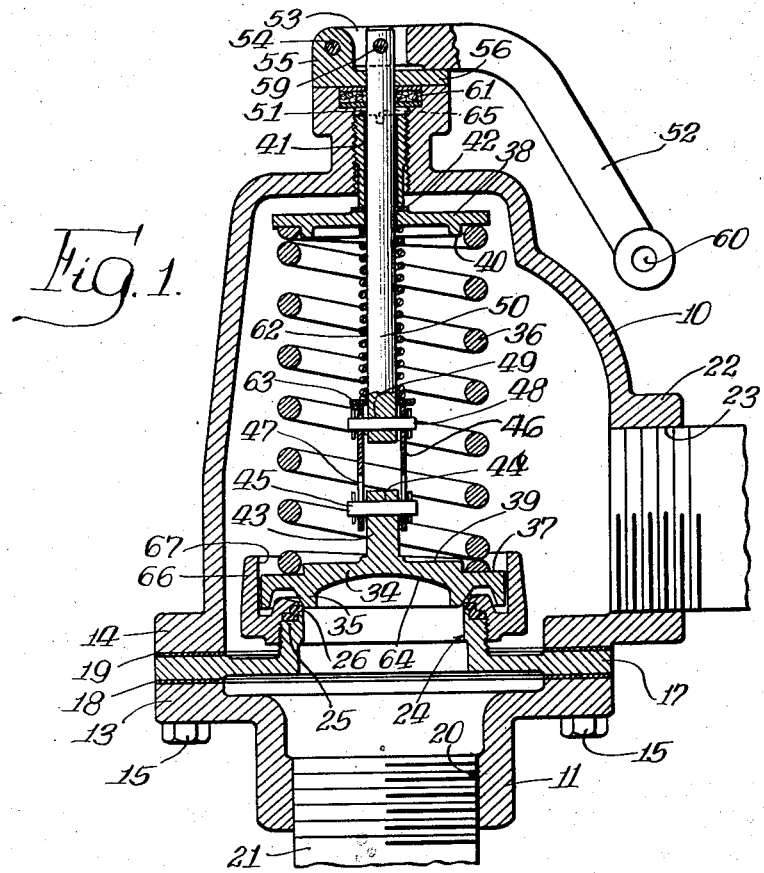
Figure 1 illustrates the invention as embodied in a pressure-relief valve there shown in section.

Referring now to Figure 1 of the drawings a pressure-relief valve is there shown which comprises a generally tubular body portion 10 and a tubular base portion 11. The base 11 is provided at its upper end with an outwardly extending radial flange 13 adapted to mate with the lower surface of a similarly flanged portion 14 of the main body 10 and is suitably secured thereto by means of a plurality of machine screws 15. Between said flange portions 13 and 14 is secured valve seat supporting member 17. Annular gaskets 18 and 19 of suitable resilient material are disposed on opposed sides of member 17 and between it and flanges 13 and 14 so as to obtain a desired seal of the body 10 and base 11 with respect to one another. The base 11 is provided with a central threaded bore 20 constituting an inlet to the valve body and adapted for the reception of an inlet pipe or conduit 21 which is in communication with a pressure tank or fluid pressure system with which the valve of the present invention is adapted to be associated. The tubular body portion 10 is provided with an outwardly extending radial boss 22 within which a threaded bore 23 is formed, the bore constituting a fluid outlet for the body of the valve and is adapted for the reception of an outlet pipe or conduit which may lead to a suitable point of drainage or the like.

Support member 17 has a centrally disposed integrally related tubular section 24 terminating in a stepped end surface portion 25 on which I dispose my annular valve seat member 26 of inert heat resistant durable synthetic resinous material such as the polymerized tetrafluorethylene, silicone resins and like materials as above described. I preferably dimension said valve seat member 26 so that its inner and outer edges are substantially flush with the respective inner and outer surfaces of the said tubular section 24.

In order that it may be locked or anchored to the end of said tubular section 24 I preferably provide said member 26 (Figure 3) with an inner peripheral portion 27 and an outer peripheral portion 28 which are in different planes and connected by an integral intermediate portion 29 having opposed parallel surfaces at approximately right angles to the parallel surfaces of its inner and outer peripheral portions 27 and 28, giving it a stepped shape in section.

Figure 3:
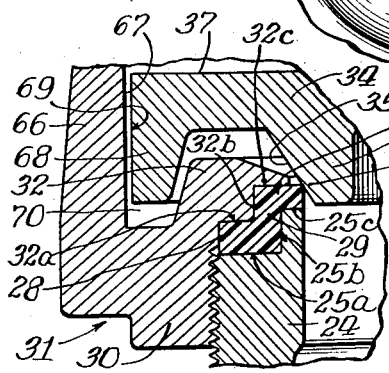
Figure 3 is an enlarged fragmentary view in section of the valve member, its seat and clamping means therefor.

This member 26 I clamp between the end portion 25 of said tubular support 24 and a clamp member 31, the contacting surfaces of which are similarly stepped so as to approximate the shape of the valve ring member 26. Thus, as seen in Figure 3, I form the end surface 25 of the tubular support 24 so that it has inner and outer parallel portions 25c and 25a and a normally disposed intermediate portion 25b against which portions 27, 28 and 29, respectively, of the valve ring member 26 closely fit. I also provide the clamp member 31 with an overhanging lip 32 formed with an under surface which is also similarly stepped so as to have parallel portions 32a and 32c and a normally disposed intermediate cylindrical surface portion 32b to respectively engage with the opposite side surface of said portions 27, 29 and 28 of the annular valve seat forming member 26.

To effect securement of the member 26 between said lip 32 of the clamp 31 and surface 25 of the tubular support 24, I provide the clamp member with an encircling portion 30 which I threadedly connect with the outer threaded periphery of the tubular section 24 whereby surface 32a of the clamp may be drawn against portion 28 of the valve seating member 26 to tightly compress and clamp it against portion 25a of the end surface of the tubular section 24. Surface portions 32b of the clamp 31 and 25b of the tubular section 24 are preferably dimensioned to be spaced apart a distance substantially no greater than the thickness of portion 29 of the valve seating member 26, so that simultaneously said portion will also be compressed between the surfaces 25b and 32b as clamp 31 is tightly threaded onto tubular section 24. Preferably, however, I form surface 32b high enough that the aforesaid compression of portion 28 between the respective surfaces 32a and 25a of the clamp and tubular section can be obtained without introducing any substantial amount of compression on portion 27 of the ring 26. Thus, I contemplate that portion 32c of the clamp 31 will serve primarily as a protective cover for portion 27 of the ring 26 while permitting it a certain latitude of accommodating movement or capacity for distortion under the pressure of the valve member 34 thereon so as to obtain a close fitting intimate seal. The compression of portions 28 and 29 between the respective surfaces 32a and 32b of the clamp lip 32 and surfaces 25a and 25b of the tubular section 24 will ordinarily be sufficient to prevent either axial or lateral displacement of the ring 26.

As mentioned above, the inner periphery of the valve seat member 26 is preferably dimensioned to coincide with the inner diameter of the upstanding tubular section 24. However, the diameter of the opening defined by the cap portion 32c of said clamp member 31 is purposely made somewhat larger so as to leave exposed a narrow margin of the portion 27 of the valve seat member 26 adjacent its inner peripheral edge 33 on which valve member 34 normally rests to restrict flow through the valve from the inlet 20 to the outlet 23. As seen in Figure 1, the valve member 34 has an annular depending portion 35 which extends within the opening defined by the annular seat member 26 and is formed with an outer peripheral surface 35a of generally frusto-conical shape to have continuous line contact with said edge 33 of member 26.

Valve member 34 is normally held on its seat by means of a spring 36 which is preferably a helically coiled spring. The spring 36 is suitably confined between and retained by the upper surface 37 of the valve member 34 and a retainer member 38. Valve member 34 has a centrally disposed raised area 39 on its upper side and the retainer 38 has a depending annular portion 40 each of which are dimensioned to approximate the inner diameter of the opposed ends of the helical spring 36 so as to hold the ends of said spring against lateral displacement. Retainer 38 is held against movement by a calibrating screw 41 operatively associated with the valve body 10. To reduce friction between the surface of retainer 38 and the end of calibrating screw 41, I preferably provide a washer-like member 42 of polymerized tetrafluoroethylene or other suitable material having a low coefficient of friction. The valve member 34 is thus controlled by the tension of spring 36 and is adapted to be automatically opened upon occurrence of fluid pressures within the inlet 20 and the chamber defined by the base 11 and the valve seat member 34 in excess of the calibrated force of the spring 36.

Preferably, manual means are also provided for opening the valve to vent the fluid pressure tank or system, with which the valve is associated to atmosphere or to a suitable point of drainage. To this end, the valve member 34 is further provided with a centrally disposed upstanding portion 43 having a transverse bore 44 adapted for the reception of a pin 45 having portions extending to either side of the upstanding portion 43 of said valve member 34. A U-shaped strap or clevis 46 having elongated slots 47 for the reception of the pin 45 is secured by a second pin 48 extending through a transverse bore 49 provided in the lower end of a cylindrical rod or stem 50. The slots 47 in the legs of the clevis 46 provide a lost-motion connection between the valve stem 50 and the upstanding portion 43 of the valve member whereby automatic actuation of the valve 34 under the force of fluid pressure in the chamber in the base 11 will not effect movement of the stem 50.

Figure 2:
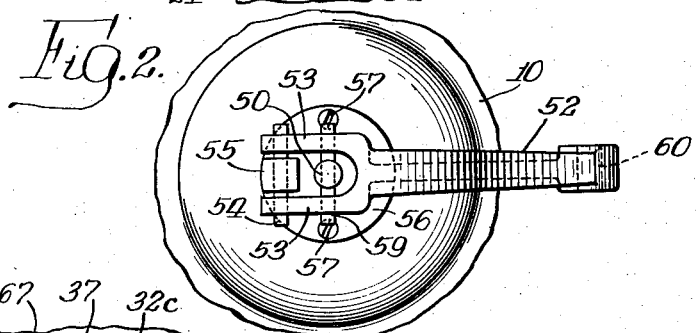
Figure 2 shows the top end of said pressure-relief valve.

The retainer 38 as well as the calibrating screw 41 and low friction washer 42 are each provided with a central aperture or axial bore for the slidable passage therethrough of the rod 50. The body 10 is also provided with a bore 51 adapted for the passage of the rod 50 so that the rod 50 extends exteriorly of the body 10 to atmosphere and may be manually actuated to lift the valve 34 off its seat 33 to vent the pressure chamber in the base member 11. To provide means for effecting the manual actuation of the stem 50 a lever 52 is provided having a bifurcated end 53 (Figure 2) connected by pin means 54 for pivotal movement about its connection with portion 55 of cap member 56 which is secured to the top of valve body 10 by means of screws 57. Rod 50 and said lever 52 are pivotally connected together by means of a pin 59 passing through the bifurcated portions of the lever arm 52 and through a suitable aperture provided in the upper end of the stem 50. If desired the lever arm 52 also may be provided with an aperture 60 at the end thereof opposite its pivotal connection with the cap portion 56 for reception of a cord or the like so that the valve may be manually actuated at a considerable distance from the valve.

To seal the stem 50 with respect to the valve body 10 the valve body 10 is counterbored coaxially of its bore 51 to provide a recessed cylindrical portion adapted for the reception of seal means 61 which, engaging the peripheral surface of the stem 50 and also the body of the valve, provide a seal therebetween. The seal 61 is suitably backed and retained within the body 10 by means of the previously mentioned cap member 55 which is secured to the valve body 10 by the mentioned screws 57.

To maintain stem 50 and lever 52 in their normal position as shown in Figure 1 of the drawing, a helical spring 62 which is preferably a relatively weak spring having approximately the diameter of the washer 42 and calibrating screw 41 is confined between the retainer 38 and a plate 63 slidable along the stem 50 and engaging the end of the strap 46. After manual actuation of the valve, the lever 52 and stem 50 will return to their normal position, as illustrated in Figure 1, due to the action of the spring 62 and the valve 34 will be returned to its seat on the valve seat member 26 by means of the first mentioned spring 36. Upon automatic actuation of the valve, the pin 45 will slide within the slots 47 in said clevis strap 46 so that the spring 62 will maintain the lever 52 and the stem 50 in the normal position shown in the drawing.

In operation, as fluid pressure within the chamber in the base 11 reaches a certain magnitude, determined by the compressive force exerted by the spring 36, the valve 34 will be automatically opened. In other words, as the fluid pressure within the chamber in the base 11 acting upon the exposed central area 64 of the valve 34 becomes sufficient to overcome the compressive force of the spring 36, valve 34 is forced off its seat 26 to vent the pressure system or tank with which it is associated or to establish communication between the inlet pipe 21 and the outlet pipe 23.

The pressure at which the valve 34 will open can be controlled by varying the degree of compression of the spring 36. For this reason bore 51 in the body 10 is threaded for adjustable reception of the aforementioned calibration screw 41. Turning said calibrating screw 41 in one direction obviously will function to increase the compression of the spring 36, while its compression may be decreased by turning the screw 41 in the opposite direction. A suitable kerf 65 is provided in the upper end of the calibration screw 41 so that the screw may be engaged by a suitable tool for turning to insure exact vertical displacement of the valve member 34 under the fluid pressure acting on its surface 64.

As a means of more positively maintaining a desired alignment of the valve member 34 with its annular seat 26 during its opening and closing, I provide the clamp member 31 with an upstanding generally cylindrical portion 66 having its inner peripheral surface 67 machined to define a smooth cylindrical surface, the axis of which coincides with the axis of the valve member 34 and spring 36. I also provide a depending portion 68 on the outer edge of the valve member 34 which has a relatively wide cylindrical surface 69 which I similarly shape and dimension to engage and be guided by said surface 67. This has the advantage of minimizing horizontal play of the valve member 34 during its vertical movement in response to pressure change and so reduces wear on the valve seat 26. A recess 70 is preferably provided in clamp member 36 at the base of surface 67 to provide clearance for portion 68.

Thus, it will be apparent that all of the objects and advantages of the invention have been demonstrated as being obtainable in a convenient, simple and practical manner. It is further to be understood that although the invention has been described as applied to the valve seat in a pressure-relief type valve the invention in its broader respect will have application generally to valves of all types.

Having described my invention, I claim:

1. In a valve having an inlet and an outlet, a valve seat comprising an annulus of inert heat-resistant thermosetting resin having a low coefficient of friction, said annulus being of stepped section to include integrally related inner and outer offset annular parts each having a pair of opposed planar surfaces and a pair of concentric cylindrical opposed surfaces in non-coinciding relation, a valve closure member releasably engaging an annular portion of one of said annular parts of the valve seat to cut off communication between the inlet and outlet, and anchoring means including surfaces having wide area bearing contact with the opposed cylindrical and opposed planar surfaces of the other annular part of the valve seat in constraining relation therewith, said means having further surfaces in wide area contact with one of the cylindrical surfaces and in non-constraining engagement with the two opposed planar surfaces of the first mentioned annular part save for adjacent the portion thereof with which the valve closure member releasably engages, said portion being left exposed for engagement by the valve member, said first mentioned annular part conforming to the valve closure member which seats thereagainst to obtain an intimate seal therebetween without radial or axial displacement of the annulus and so that a long-wearing, non-clogging, effectively sealing, positive seat for said valve closure member is obtained.

2. In a valve having an inlet and an outlet, a valve seat comprising an annulus of inert heat-resistant thermosetting resin having a low coefficient of friction selected from the group consisting of fluorinated polymer and silicone resin, said annulus being of stepped section to include integrally related inner and outer peripheral portions each having opposed parallel planar surfaces, said inner and outer peripheral portions being disposed in different planes and connected by an integral intermediate portion having concentric cylindrical opposed surfaces at approximately right angles to the parallel planar surfaces of its inner and outer peripheral portions, a valve closure member releasably engaging a peripheral edge of one of said portions of the annulus to cut off communication between the inlet and outlet, and clamp means having a first pair of surfaces having wide area bearing contact with the opposed planar surfaces of the other annular part tightly compressing said part therebetween to secure said part, a second pair of surfaces having wide area contact with the opposed cylindrical surfaces of the integrally connected intermediate portion of the said annulus simultaneously compressing and holding said portion immobile, and a third pair of surfaces engaging in wide bearing but non-constraining contact with the planar surfaces of the first mentioned peripheral portion save for a part thereof immediately adjacent the edge on which the valve member releasably engages, said part being left exposed for engagement by the valve member, said edge of the first mentioned peripheral portion conforming to the valve closure member which seats thereagainst to obtain a close fitting intimate seal therewith and without radial or axial displacement of the annulus so that a long-wearing, non-clogging, effectively sealing, positive seat for said valve closure member is obtained.

3. In a valve having an inlet and an outlet, the combination of an annular valve seat member stepped in section to comprise an inner annular part and an integrally related outer offset annular part, each part having a pair of opposed cylindrical surfaces which are in concentric non-coinciding relation with those of the other parts and a pair of opposed parallel planar surfaces disposed normal to said cylindrical surfaces, said planar surfaces also being in parallel non-coinciding relation with the surfaces of the other part, a frusto-conical valve closure member releasably resting on the inner peripheral edge of the inner annulus part which constitutes a seat therefor to cut off communication between the inlet and outlet, and clamping means having a pair of stepped rigid annular surfaces intimately engaging, throughout the entire area thereof, with the opposed parallel planar surfaces and opposed concentric cylindrical surfaces of the offset outer annular part, and, in addition intimately engaging, throughout the entire area thereof, the outer cylindrical and opposed parallel planar surfaces of the inner annular part save for the portion of one said planar surface immediately adjacent the peripheral edge thereof on which the valve closure member releasably rests, said valve seat member being formed of inert, heat resistant thermosetting polymerized tetrafluorethylene resin having a low coefficient of friction and which is held by said clamping means against axial and transverse movement such as to prevent creep and bodily flexing of said parts whereby a non-clogging, long wearing effective seal between the valve closure member and its seat is obtained.

4. In a valve having inlet and outlet forming means, one of said means having a circular-shaped opening therethrough and a surrounding stepped end surface comprised of inner and outer offset parallel planar annular surfaces and an intermediate right angularly disposed cylindrical annular surface concentric with its said circular opening, an annulus of inert heat-resistant thermosetting resin having a low coefficient of friction seated on said stepped end surface and having its inner and outer edges substantially flush with the respective inner and outer edges of said stepped end surface, said annulus being similarly stepped to include a pair of integrally related inner and outer peripheral portions each having opposed parallel planar surfaces and which portions are disposed in different planes and connected by an integral intermediate portion having concentric cylindrical opposed surfaces at approximately right angles to the parallel surfaces of its inner and outer peripheral portions, said inner, outer and integral intermediate portions having one side surface closely fitting against the adjacent inner, outer and intermediate annular surfaces of said stepped end surface of said forming means, a frusto-conical shaped valve closure member releasably engaging the inner peripheral edge of the inner peripheral portion of the annulus to cut off communication through the valve between its inlet and outlet, and clamp means carried by said forming means, said clamp means having a stepped annular end surface overlying the opposed side surface of the annulus and including an outer ring surface tightly compressed against the adjacent planar surface of the outer peripheral portion of the annulus, a second ring surface at right angles to its outer surface and compressed against the adjacent cylindrical surface of the integrally connected intermediate portion of the said annulus and a third ring surface overlying in wide area bearing but nonconstraining contact with the planar surface of the inner peripheral portion of the said annulus, said third ring surface having an inner diameter dimensioned to leave a clearance area immediately adjacent the inner edge of the annulus on which the valve member releasably engages, said inner edge of the annulus conforming to the valve closure member which seats thereagainst to obtain a close fitting intimate seal therewith and without radial or axial displacement of the annulus so that a long-wearing, non-clogging, effectively sealing, positive seat for said valve closure member is obtained.

5. In a valve according to claim 4, wherein the clamp means is threadedly connected to the forming means and further includes upstanding guide means for limiting movement of the valve closure member radially of the opening through the forming means whereby the closure member will be properly centered relative to the peripheral edge of the annulus on which it seats.

References Cited in the file of this patent
UNITED STATES PATENTS

| | | |
|---|---|---|
| 2,348,548 | Koehler | May 9, 1944 |
| 2,673,062 | Cornelius | Mar. 23, 1954 |
| 2,695,032 | Kmiecik | Nov. 23, 1954 |
| 2,696,967 | Wilson et al. | Dec. 14, 1954 |
| 2,786,645 | Ralston | Mar. 26, 1957 |

OTHER REFERENCES

"Silicone Materials," Product Engineering Magazine, April 1946, (pp. 304–306 relied on). (Copy in Scientific Library & Div. 52.)